(12) United States Patent
Ciolczyk et al.

(10) Patent No.: US 8,248,748 B2
(45) Date of Patent: Aug. 21, 2012

(54) DUCTING FOR A FUEL PIPELINE OF AIRCRAFT OR SPACECRAFT, METHOD FOR PRODUCING SAME AND AIRCRAFT WING INCORPORATING SAME

(75) Inventors: Jean-Pierre Ciolczyk, Montargis (FR); Julien Bouleti, Orleans (FR); Marc Dolez, Olivet (FR)

(73) Assignee: Hutchinson, Paris (FR)

( * ) Notice: Subject to any disclaimer, the term of this patent is extended or adjusted under 35 U.S.C. 154(b) by 385 days.

(21) Appl. No.: 12/578,153

(22) Filed: Oct. 13, 2009

(65) Prior Publication Data

US 2010/0116941 A1  May 13, 2010

(30) Foreign Application Priority Data

Oct. 17, 2008  (FR) ...................... 08 05783

(51) Int. Cl.
*H01H 47/00* (2006.01)
(52) U.S. Cl. ....................... 361/212; 361/220
(58) Field of Classification Search .......... 361/212, 361/218, 220
See application file for complete search history.

(56) References Cited

U.S. PATENT DOCUMENTS

| | | | |
|---|---|---|---|
| 5,261,991 A | 11/1993 | Zackrisson et al. | |
| 6,315,004 B1 * | 11/2001 | Wellman et al. | 138/146 |
| 2002/0017333 A1 * | 2/2002 | Wellman et al. | 138/146 |
| 2003/0000592 A1 | 1/2003 | Wellman et al. | |

FOREIGN PATENT DOCUMENTS

| | | |
|---|---|---|
| EP | 1 264 717 | 12/2002 |
| EP | 1 589 270 | 10/2005 |
| GB | 1 231 091 | 5/1971 |
| JP | 63 249631 | 10/1988 |

OTHER PUBLICATIONS

International Search Report from French Application No. 08 05783, filed Oct. 17, 2008.

* cited by examiner

*Primary Examiner* — Danny Nguyen
(74) *Attorney, Agent, or Firm* — Alston & Bird LLP

(57) ABSTRACT

The invention relates to a ducting for a fuel pipeline of an aircraft or spacecraft designed to be mounted in each of the wings of an aircraft, an aircraft wing incorporating this ducting and a method for producing same. This ducting comprises at least one multilayer pipe having two respectively inner and outer layers made of a composite plastic material that is leakproof and chemically resistant to the fuel and that is reinforced by electrically conductive reinforcing means, these layers being separated by an intermediate layer, notably capable of stiffening the pipe when flexed and/or to insulate it electrically. Each of the inner and outer layers has at least one winding with contiguous turns of a continuous element made of a composite thermoplastic incorporating these reinforcing means.

22 Claims, 2 Drawing Sheets

Figure 5:
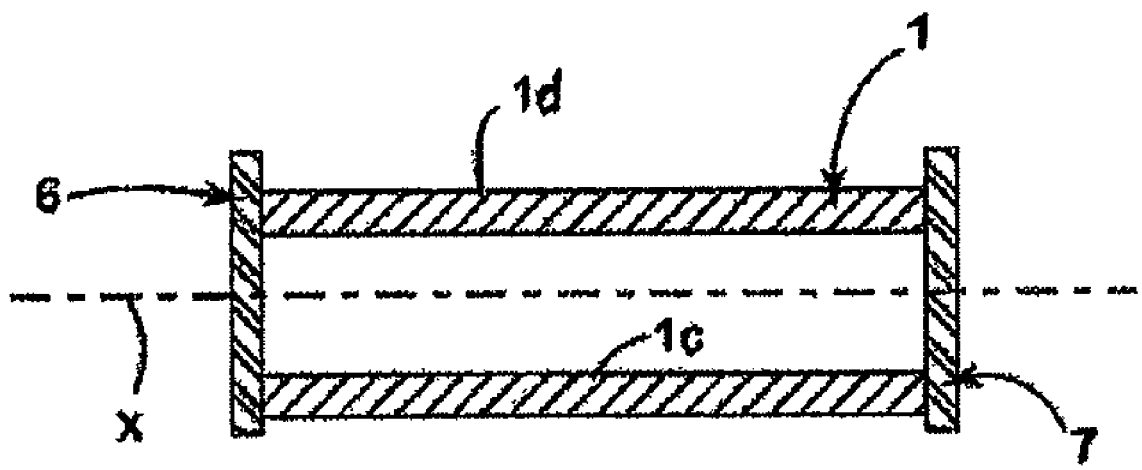

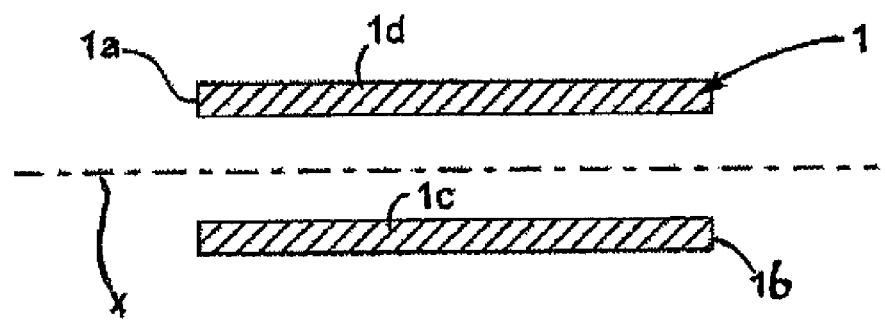
Fig. 1
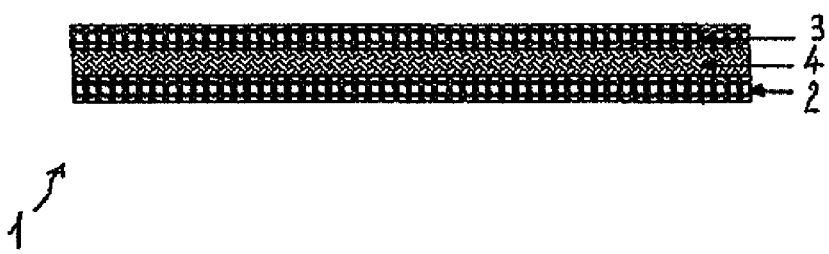
Fig. 2
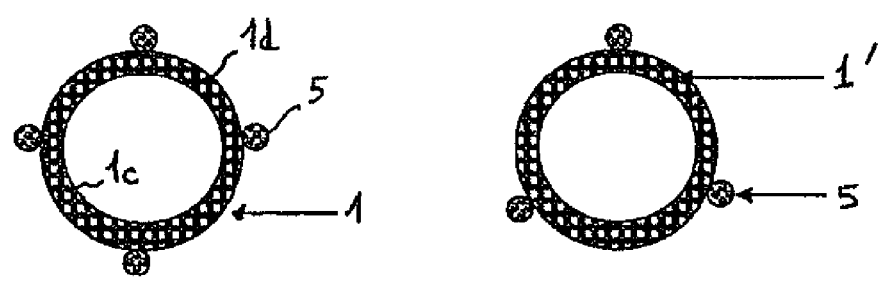
Fig. 3  Fig. 4

DUCTING FOR A FUEL PIPELINE OF AIRCRAFT OR SPACECRAFT, METHOD FOR PRODUCING SAME AND AIRCRAFT WING INCORPORATING SAME

The present invention relates to a ducting for a fuel pipeline of an aircraft or spacecraft, in particular designed to be mounted in each of the wings of an aircraft, an aircraft wing incorporating this ducting and a method for producing same.

The fuel pipes or lines for current aircraft are usually made of aluminum, as is the case with the wings in which they are housed. Nevertheless, for several years now wings and fuel pipelines have started to be designed in composite materials, so as to lighten as much as possible these pipelines and the wing units incorporating them. Mention may be made for example of document WO-A1-2006/136597 for an example of composite ducting comprising two coaxial inner and outer conduits separated by struts and that are at least partly made of a composite thermosetting material, such as an epoxy resin reinforced by carbon fibers.

Apart from this weight gain, an attempt has been made to control the electrical conductivity of the assembly of the wing unit in the case of a lightning strike, while eliminating electrostatic charges inside these pipelines. In point of fact, it should be ensured that during a lightning strike, on the one hand lightning flows mainly through the structures of the wings and, on the other hand, that the accumulation of electrostatic charges inside the pipeline through which the fuel flows is strictly limited in order to prevent any risk of explosion by ignition of the fuel.

Research carried out on these composite pipelines has led to a design for pipes with composite thermosetting multilayers having two, an inner and an outer, layers or "skins", each of which is typically based on an epoxy resin reinforced by carbon fibers and that are separated by an intermediate layer or "core" typically based on this same epoxy resin reinforced with glass fibers. The conductivity of the inner and outer layers that the electrically conducting carbon fibers afford is provided so as to enable electrostatic charges to be eliminated through the inner layer and to divert lightning from the interior of the pipe through the outer layer. As regards the intermediate layer, it is essentially provided to insulate electrically the outer layer from the inner layer through the glass fibers that it incorporates, while giving, via the latter, a high modulus of inertia to the pipe (i.e. satisfactory resistance to flexing forces).

Although these ductings with composite thermosetting multilayers enable electrical conductivity to be controlled satisfactorily, in terms of the evacuation of internal electrostatic charges and for protection of fuel from lightning, they nevertheless present the major disadvantage of being decidedly heavier than the usual aluminum ductings on account of the fact that glass fibers are used in the intermediate insulating layer. Another disadvantage of these known composite ductings lies in their relatively high manufacturing costs, which is due to successive operations of deposition and consolidation of three thermosetting layers.

It is moreover known to use monolayer pipelines made of epoxy resin for these fuel pipelines, which contains graphite as the electrically conductive filler and that is reinforced by glass fibers as the reinforcing filler.

One object of the present invention is to provide a ducting for a fuel pipeline for an aircraft or spacecraft, in particular designed to be mounted in each of the wings of an aircraft, which overcomes these disadvantages, the ducting comprising at least one multilayer pipe having two respectively inner and outer layers, each made of a composite plastic material that is leakproof and chemically resistant to the fuel and that is reinforced by electrically conductive reinforcing means, these layers being separated from each other by an intermediate layer, notably capable of stiffening the pipe when flexed and/or to insulate it electrically.

To this end, each of the inner and outer layers has at least one winding with contiguous turns around the axis of symmetry of the pipe, of a continuous element made of a composite thermoplastic material with a thermoplastic matrix incorporating these reinforcing means, so that this pipe enables electrostatic charges to be eliminated through its inner layer and electric charges due to lightning to be deflected through its outer layer while having a high modulus of inertia and reduced mass.

The expression "by means of a winding with contiguous turns" is understood to mean, in the present description, one or more radially superimposed cylindrical plies, it being possible for the or each ply included in the inner layer and in the outer layer to be formed from at least one continuous composite thermoplastic element (i.e. one or more elements, each all in one piece and with an extensive length), which is rolled over a cylindrical surface without an axial space between the contiguous turns formed (which may be covered two-by-two along the pipe) to ensure that the layers are fuel-tight.

It will be noted that the structure with inner and outer layers formed of windings, which characterizes the composite pipe according to the invention, has the double advantage of having a reduced weight and of being able to be made simply at low cost in comparison with known thermosetting structures incorporating glass fibers, while making it possible to control the conductivity of the whole structure satisfactorily via the conductive reinforcements used in these inner and outer layers.

It will also be noted that a pipe according to the invention may have a geometry that is as much straight as elbowed or bowed (i.e. with possibly two-dimensional or even three-dimensional axes of symmetry), provided that it has a symmetry of revolution (i.e. cylindrical for example with a circular and/or even conic cross section).

According to another feature of the invention, said or each continuous element of the inner layer and/or of the outer layer may be formed of a strip rolled on by coiling. "Strip" is to be understood in the present description as a band or the like with a width that is very much smaller than its length. The angle that each turn of the winding makes with the axis of symmetry of the pipe is preferably substantially equal to 54°, which makes it possible to obtain a satisfactory state of equilibrium for each rolled continuous element, resisting plastic flow at the pressure to which the pipe is subject.

According to another feature of the invention, said or each continuous element of the inner layers and the outer layers may include reinforcing fibers, preferably carbon fibers, as electrically conductive reinforcing means.

Advantageously, said or each continuous element of the inner and outer layers may include, as reinforcing means, carbon fibers mixed with other electrically insulating reinforcing fibers, which are preferably glass or aramid fibers, in order to adjust the electrical conductivity of the whole structure.

Also and preferably, said or each continuous element of the inner and outer layers is based on at least one thermoplastic polymer chosen from the group consisting of polyamides, polyetherimides (PEI), phenylene polysulfides (PPS), polyetheretherketones (PEEK), polyetherketoneketones (PEKK) and mixtures thereof. It will be noted that other thermoplastic polymers may be used, provided that they are leakproof and have satisfactory chemical resistance to the fuel.

Even more preferably, the thermoplastic matrix of said or each continuous element of the inner and outer layers is based on a PA11 or PA12 polyamide, and said reinforcing means for these layers contain long carbon fibers.

Advantageously, said or each continuous element of the inner and outer layers may additionally contain graphite as an electrically conductive filler dispersed in this thermoplastic matrix, for example in addition to a mixture of carbon fibers and glass or aramid fibers.

Advantageously, the intermediate layer of the pipe may include at least one winding with contiguous turns around the inner layer, of an intermediate continuous layer with a thermoplastic matrix, which is preferably identical to the thermoplastic matrix of the inner and/or the outer layers but which lacks any reinforcing means. The or each intermediate layer may then be formed of a strip wound by coiling on the inner layer and it may additionally contain at least one electrically conductive filler dispersed in its thermoplastic matrix, such as carbon black or short carbon fibers.

According to a variant of the invention, the intermediate layer of the pipe may be able to dampen vibrations propagated along the fuel pipeline, being then preferably based on at least one elastomer of the rubber or thermoplastic elastomer type, or of at least one thermoplastic polymer suitable for producing this dampening.

In either case, it will be noted that this intermediate layer is advantageously totally lacking in glass fibers, which makes it possible to lighten the multilayer pipe incorporating it, in comparison with known composite pipes with an intermediate layer reinforced with glass fibers.

Optionally, the pipe may additionally include, under the inner layer, an inner coating defining the radially inner surface of the pipe and/or on the outer layer, an outer sheath defining the radially outer surface of the pipe, this coating and this sheath being preferably extruded or wound around the axis of symmetry of the pipe.

It will be noted that this inner coating and/or this sheath may make it possible to improve the physical and chemical properties of the pipe, for example leakproofness, surface appearance or resistance to contaminating products.

Advantageously, the pipe may be stiffened on its radially outer surface by a plurality of axial ribs fixed to this surface for example by welding or adhesion while being regularly spaced, so that the rigidity on flexing and the strength of the pipe under pressure and under reduced pressure are increased. Each rib is preferably formed of a thermoplastic bead that is optionally reinforced by continuous or discontinuous fibers.

It will noted that the number of these ribs will be chosen according to the desired mechanical and antivibratory properties.

According to another feature of the invention, said pipe may be provided with connecting endpieces at its respective extremities that are secured to the pipe and that are advantageously made of a thermoplastic material, a thermoplastic composite possibly including metallic inserts or of a metallic material.

Preferably, these endpieces are made of a thermoplastic material or of a thermoplastic composite identical to or different from that of the inner and outer layers of the pipe, the material of these endpieces optionally including reinforcing fibers and/or electrically conductive fillers. In this preferred case, each endpiece is advantageously connected to the pipe by rotation welding or by adhesion, and is in contact with the radially inner and outer surfaces of the pipe so as to ensure electrical equipotentiality between these surfaces.

As a variant, each endpiece may be formed in a single piece with the pipe by overmoulding, while being mounted in contact with the radially outer surface of the pipe.

An aircraft wing according to the invention, which contains a fuel pipeline having ductings connected to a fuel tank of the aircraft, is characterized in that at least one of these ductings is as defined above.

A method according to the invention for producing a multilayer pipe for a ducting as defined above substantially comprises the following successive steps:
a) winding by coiling with contiguous turns on a mandrel of at least one inner continuous element, such as a strip, made of a composite thermoplastic material with a thermoplastic matrix for example made of polyamide, and incorporating electrically conductive reinforcing means, such as carbon fibers possibly mixed with other electrically insulating reinforcing fibers such as glass or aramid fibers, and then continuously consolidating the or each inner element wound in this way in order to obtain an inner layer of the pipe,
b) forming an intermediate layer of the pipe:
(i) either through winding by coiling with contiguous turns on the inner layer at least one intermediate element, such a strip made of a thermoplastic material non-reinforced with a thermoplastic matrix, preferably identical to that of said inner continuous element, and then continuously consolidating the or each intermediate element wound in this way,
(ii) or by covering the inner layer with this intermediate layer which is preferably based on at least one elastomer of the rubber or thermoplastic elastomer type or on at least one thermoplastic polymer and which is able to dampen vibrations propagated along the fuel pipeline, and then
c) winding by coiling with contiguous turns on this intermediate layer at least one outer continuous element, such as a strip, made of a composite thermoplastic material that has a thermoplastic matrix incorporating electrically conductive reinforcing means, such as carbon fibers, and which is preferably similar to that of said inner continuous element, and then continuously consolidating the or each intermediate element wound in this way so as to obtain an outer layer of the pipe.

As previously indicated, the aforementioned windings are preferably produced while ensuring that the angle each turn of the winding of the inner, intermediate and/or outer layer makes with the axis of symmetry of the pipe, is substantially equal to 54°.

This method may advantageously include a subsequent step of fixing the connecting endpieces with the respective extremities of the pipe, these endpieces being made:
either separately of a thermoplastic material or thermoplastic composite possibly including metallic inserts or made of a metallic material, this fixing being achieved by rotation welding or by adhesion of the endpieces in contact with the radially inner and outer surfaces of the pipe, so as to ensure electrical equipotentiality between these surfaces,
or in one piece with the pipe by overmoulding a thermoplastic material or thermoplastic composite, each endpiece then contacting the radially outer surface of the pipe.

Figure 6:
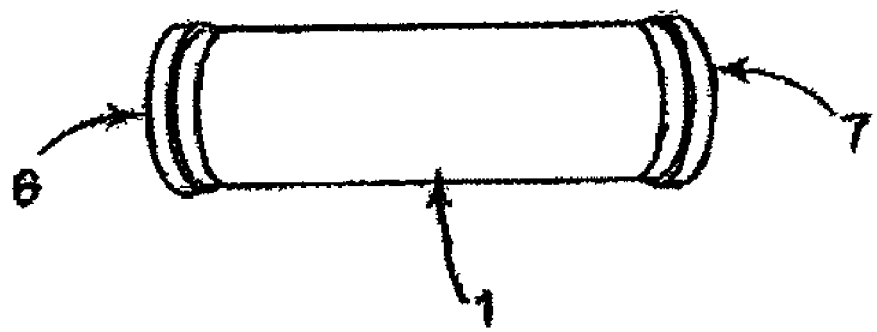

Other features, advantages and details of the present invention will become apparent on reading the following description of embodiments of the invention, given as illustrations in a non-limiting way, said description being given with reference to the appended drawings, among which:

FIG. 1 is a schematic view in axial section of a pipe for a ducting according to the invention, FIG. 2 is a detailed schematic view in axial half-section of the pipe of FIG. 1, illustrating the multilayer structure of this pipe according to an example of an embodiment of the invention, FIGS. 3 and 4 are schematic views in radial section of pipes according to two embodiment variants of the invention, this pipe being respectively provided with four and three stiffening ribs, FIG. 5 is a schematic view in axial section of a pipe according to the invention equipped with connecting endpieces at its respective extremities, and FIG. 6 is a view illustrating an embodiment of the pipe of FIG. 4 equipped with these endpieces.

The multilayer pipe 1 illustrated in FIGS. 1 to 6 is in particular designed to equip a ducting for the fuel pipeline housed in an aircraft wing. This pipe 1 according to the invention substantially comprises:

two radially inner 2 and outer 3 layers, each made of composite plastic material that is leakproof and chemically resistant to the fuel of the aircraft and that is reinforced by electrically conductive reinforcing fibers, preferably long carbon fibers, for example blended with electrically insulating fibers such as glass or aramid fibers, and an intermediate layer 4 separating these layers 2 and 3 from each other, which is able to stiffen the pipe on flexing and of electrically insulating and/or of dampening vibrations propagated along the fuel pipeline.

According to the invention, the inner layer 2 and the outer layer 3 each comprises at least one winding with contiguous turns made by coiling a strip or the like about the axis of symmetry X of the pipe 1, and these layers 2 and 3 are made respectively of thermoplastic composite materials that are preferably chosen to be similar. The material of layer 2 and of layer 3 includes a thermoplastic matrix based for example on PA11 or PA12 polyamide in which the aforementioned reinforcing fibers are incorporated. As previously indicated, it will be noted that use may also be made in the thermoplastic matrix of one or other of these layers 2 and 3, of any other thermoplastic polymers, notably having properties of leakproofness and chemical resistance to the chosen fuel.

As regards the intermediate layer 4, it may also include at least one winding with contiguous turns, around the inner layer 2, of a strip with a thermoplastic matrix spooled onto the inner layer 2. The thermoplastic matrix of layer 4 is preferably identical to that of layer 2 (e.g. based on PA11 or PA12) but lacks any reinforcing means.

As a variant, this intermediate layer 4 may be capable of dampening vibrations propagated along the ducting, being then based on an elastomer of the rubber or thermoplastic elastomer type or of a thermoplastic polymer suitable for providing this dampening.

Optionally, in one or other case, the intermediate layer 4 may contain an electrically conductive filler dispersed in its thermoplastic matrix, such as carbon black or short carbon fibers, in a non limiting way.

As an indication, the thickness of each layer 2, 3, 4 of the pipe 1 is for example between 0.4 mm and 0.6 mm.

It will be noted that an inner coating and/or an outer sheath for the pipe 1 could be deposited radially under the layer 2 and/or radially on the layer 3, respectively, for example to improve the physical and chemical properties of the pipe 1.

This pipe is advantageously produced as follows.

To start, the or each reinforced and electrically conductive thermoplastic strip is designed to form the inner layer 2, is wound by coiling on a mandrel, advantageously at an angle of 54° to the axis X, and then continuously consolidated.

The or each non-reinforced plastic strip (preferably with a thermoplastic matrix identical to that of the strip of layer 2) is then wound on this inner layer 2, equally by coiling and advantageously at an angle of 54° to the axis X, and is then continuously consolidated so as to obtain the intermediate layer 4. In the aforementioned variant, the layer 2 is covered by the aforementioned elastomeric material or thermoplastic.

The or each reinforced and electrically conductive thermoplastic strip preferably made of a similar material to that of the inner layer 2, is then wound on this layer 4 still by coiling with contiguous turns and advantageously at the same angle of 54° and then the or each strip wound in this way is continuously consolidated in order to obtain the outer layer 3.

As illustrated in FIGS. 3 and 4, the pipe 1, 1' may be stiffened on its radially outer surface by axial ribs 5 secured to this surface for example by welding or adhesion while being regularly spaced, with a view to increasing still further the modulus of inertia and the strength of the pipe 1, 1' under pressure/pressure reduction. Each rib 5 is for example formed of a thermoplastic bead with a circular cross section, which may be optionally reinforced with continuous or discontinuous fibers. It will be noted that the number of ribs 5, preferably at least equal to three, may vary according to the desired mechanical and antivibratory properties.

As illustrated in FIGS. 5 and 6, the pipe 1 may be provided with connecting end pieces 6 and 7 at its respective extremities 1a and 1b that are fixed to it and are preferably made of a thermoplastic material or a composite thermoplastic identical to, or different from that of the layers 2 and 3 of the pipe 1. In this preferred case, each endpiece 6, 7 is advantageously connected to the pipe 1 by rotation welding (i.e. by friction) and is then in contact with the radially inner 1c and outer 1d surfaces of the pipe 1 so as to ensure their electrical equipotentiality.

As a variant, each end piece 6, 7 of the thermoplastic or composite thermoplastic type is formed in one piece with the pipe 1 by overmoulding in an injection mould, while being mounted in contact with its radially outer surface 1d.

To summarize, this pipe 1 may notably remove electrostatic charges through its inner layer 2 and deflect electrical discharges through its outer layer 3 while having a high modulus of inertia. Moreover, it is relatively light (notably on account of the absence of glass fibers) while it can be produced by a relatively simple method and therefore one that is not costly to implement, in comparison with pipes with composite thermosetting layers of the prior art.

The invention claimed is:

1. Ducting for a fuel pipeline of an aircraft or spacecraft, the ducting comprising at least one multilayer pipe having two respectively inner and outer layers, each made of a composite plastic material that is leakproof and chemically resistant to the fuel and that is reinforced by electrically conductive reinforcing means, these layers being separated from each other by an intermediate layer capable of stiffening the pipe when flexed and/or to insulate it electrically, characterized in that each of the inner and outer layers has at least one winding with contiguous turns around the axis of symmetry (X) of the pipe, of a continuous element made of a composite thermoplastic material with a thermoplastic matrix incorporating these reinforcing means, so that this pipe enables electrostatic charges to be eliminated through its inner layer and electric charges due to lightning to be deflected through its outer layer while having a high modulus of inertia and reduced mass.

2. Ducting according to claim 1, characterized in that said or each continuous element of the inner layer and/or of the outer layer is formed of a strip wound by coiling, the angle that each turn of the winding makes with said axis of symmetry (X) being substantially equal to 54°.

3. Ducting according to claim 1, characterized in that said or each continuous element of the inner and outer layers has electrically conductive reinforcing fibers as reinforcing means.

4. Ducting according to claim 3, characterized in that said or each continuous element of the inner and outer layers has, as reinforcing means, carbon fibers mixed with other electrically insulating reinforcing fibers, which are glass or aramid fibers.

5. Ducting according to claim 1, characterized in that said or each continuous element of the inner and outer layers is based on at least one thermoplastic polymer selected from the group consisting of polyamides, polyetherimides (PEI), phenylene polysulfides (PPS), polyetheretherketones (PEEK), polyetherketoneketones (PEKK) and mixtures thereof.

6. Ducting according to claim 5, characterized in that the thermoplastic matrix of said or each continuous element of the inner and outer layers is based on a PA11 or PA12 polyamide, and in that said reinforcing means for these layers contain long carbon fibers.

7. Ducting according to claim 1, characterized in that said or each continuous element of the inner and outer layers additionally contains graphite as an electrically conductive filler in addition to a mixture of carbon fibers and glass or aramid fibers.

8. Ducting according to claim 1, characterized in that the intermediate layer of said pipe has at least one winding with contiguous turns around the inner layer, of an intermediate continuous element with a thermoplastic matrix, which is identical to the thermoplastic matrix of the inner and/or outer layers but is lacking any reinforcing means.

9. Ducting according to claim 8, characterized in that said or each intermediate continuous layer is formed of strip wound by coiling on the inner layer.

10. Ducting according to claim 8, characterized in that said or each intermediate continuous element contains at least one electrically conductive filler dispersed in its thermoplastic matrix.

11. Ducting according to claim 1, characterized in that the intermediate layer of said pipe is able to dampen vibrations propagated along the fuel pipeline, being based on at least one elastomer of the rubber or thermoplastic elastomer type, or of at least one thermoplastic polymer suitable for producing this dampening.

12. Ducting according to claim 1, characterized in that the pipe additionally includes, under the inner layer, an inner coating defining the radially inner surface of the pipe and/or on the outer layer, an outer sheath defining the radially outer surface of the pipe, this coating and this sheath being preferably extruded or wound around the axis of symmetry (X) of the pipe.

13. Ducting according to claim 1, characterized in that said pipe is stiffened on its radially outer surface by a plurality of axial ribs fixed to this surface for example by welding or adhesion while being regularly spaced, so that the rigidity on flexing and the strength of the pipe under pressure and under reduced pressure are increased.

14. Ducting according to claim 13, characterized in that each of said ribs is formed of a thermoplastic bead with a substantially circular cross section that is optionally reinforced by continuous or discontinuous fibers.

15. Ducting according to claim 1, characterized in that said pipe is provided with connecting endpieces at its respective extremities that are fixed to the pipe and that are made of a thermoplastic material, a thermoplastic composite possibly including metallic inserts or of a metallic material.

16. Ducting according to claim 15, characterized in that said endpieces are made of a thermoplastic material or of a thermoplastic composite material identical to or different from that of the inner and outer layers of the pipe, the material of these endpieces optionally including reinforcing fibers and/or electrically conductive fillers.

17. Ducting according to claim 16, characterized in that each of said endpieces is connected to said pipe by rotation welding or by adhesion, and is in contact with radially inner and outer surfaces of the pipe so as to ensure electrical equipotentiality between these surfaces.

18. Ducting according to claim 16, characterized in that each of said endpieces is formed in a single piece with the pipe by overmoulding and is mounted in contact with a radially outer surface of the pipe.

19. Aircraft wing containing a fuel pipeline having ductings connected to a fuel tank of the aircraft, characterized in that at least one of these ductings is as defined in claim 1.

20. Method for producing a ducting according to claim 1, characterized in that it substantially comprises the following successive steps for manufacturing said at least one multilayer pipe:
   a) winding by coiling with contiguous turns on a mandrel of at least one inner continuous element made of a composite thermoplastic material with a thermoplastic matrix and incorporating electrically conductive reinforcing means and then continuously consolidating the or each inner element wound in this way in order to obtain an inner layer of the pipe,
   b) forming an intermediate layer of the pipe:
      (i) either through winding by coiling with contiguous turns on the inner layer at least one intermediate element, and then continuously consolidating the or each intermediate element wound in this way,
      (ii) or by covering the inner layer with this intermediate layer which is based on at least one elastomer of the rubber or thermoplastic elastomer type or on at least one thermoplastic polymer, and which is able to dampen vibrations propagated along the fuel pipeline, and then
   c) winding by coiling with contiguous turns on this intermediate layer at least one outer continuous element, made of a composite thermoplastic material that has a thermoplastic matrix incorporating electrically conductive reinforcing means, and which is similar to that of said inner continuous element, and then continuously consolidating the or each intermediate element wound in this way so as to obtain an outer layer of the pipe.

21. Production method according to claim 20, characterized in that these windings are produced so that the angle each turn of the winding of the inner, intermediate and/or outer layer makes with said axis of symmetry (X) of the pipe is substantially equal to 54°.

22. Production method according to claim 20, characterized in that it includes a subsequent step of fixing the connecting endpieces to the respective extremities of the pipe, these endpieces being made:
   either separately of a thermoplastic material or thermoplastic composite, this fixing being achieved by rotation welding or by adhesion of the endpieces in contact with radially inner and outer surfaces of the pipe, so as to ensure electrical equipotentiality between these surfaces, or in one piece with the pipe by overmoulding a thermoplastic material or thermoplastic composite, each endpiece then contacting the radially outer surface of the pipe.

* * * * *